United States Patent [19]

Shimizu

[11] 4,374,950
[45] Feb. 22, 1983

[54] ADHESIVE POLYORGANOSILOXANE COMPOSITION

[75] Inventor: Chiyuki Shimizu, Oota, Japan

[73] Assignee: Toshiba Silicone Co., Ltd., Tokyo, Japan

[21] Appl. No.: 316,172

[22] Filed: Oct. 29, 1981

[30] Foreign Application Priority Data

Oct. 29, 1980 [JP] Japan .............................. 55/151891

[51] Int. Cl.³ .............................................. C08K 5/05
[52] U.S. Cl. ...................................... 524/765; 528/20; 528/33; 528/34; 528/901; 524/788
[58] Field of Search ................. 524/765, 788; 528/20, 528/33, 34, 901

[56] References Cited

U.S. PATENT DOCUMENTS

| 4,075,154 | 2/1978 | Itoh et al. | 528/33 |
| 4,216,140 | 8/1980 | Simizu | 528/34 |
| 4,221,896 | 9/1980 | Endo | 528/34 |

*Primary Examiner*—Melvyn I. Marquis
*Attorney, Agent, or Firm*—Flynn, Thiel, Boutell & Tanis

[57] ABSTRACT

An adhesive polyorganosiloxane composition suitably employable as a sealant for joint portions of buildings, constructions, etc. which comprises:

(A) a polydiorganosiloxane being end-blocked by silanol group and having the viscosity of 100–200,000 cSt at 25° C.;

(B) an aminoxy group-containing organosilicon compound having organoaminoxy groups of more than 2 per a molecule on the average;

(C) an inorganic filler; and (D) a monovalent alcohol having the formula R—OH, in which R is a primary or secondary hydrocarbon group selected from the group consisting of a monovalent saturated aliphatic hydrocarbon group and an aralkyl group, and having the vapor pressure of at least 0.1 mmHg at 20° C.

12 Claims, 3 Drawing Figures

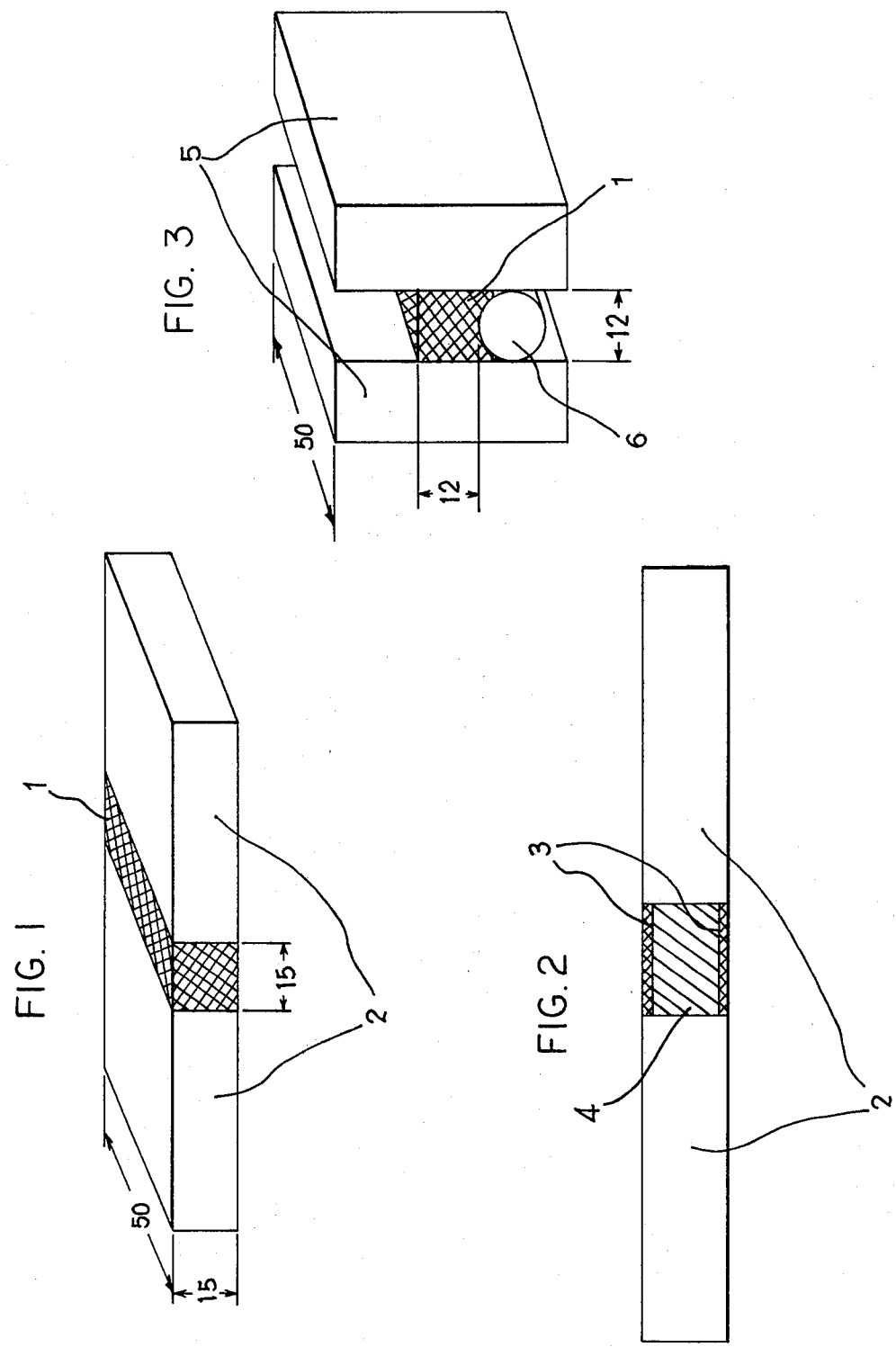

ADHESIVE POLYORGANOSILOXANE COMPOSITION

This invention relates to an adhesive polyorganosiloxane composition. More particularly, this invention relates to an adhesive polyorganosiloxane composition suitably employed as a sealant for sealing joint portions of buildings and constructions.

A polyorganosiloxane composition which is curable at room temperature to become an elastomer is excellent in heat resistance, cold resistance and weather resistance, and shows smaller changes of the properties under change of the environmental temperature and smaller deterioration under ultraviolet radiation than other adhesives. For this reason, polyorganosiloxane compositions are widely employed as sealants for sealing various portions of buildings, constructions, etc.

However, since the curing type-polyorganosiloxane composition is generally poor in the adhesion property, the portion or face to which the polyorganosiloxane composition is to be applied must be primed in advance of the sealing to acquire adhesion property to the polyorganosiloxane composition. Nevertheless, depending on the substrate, there are some portions or faces to which adhesion cannot be achieved.

There is known a sealant which does not require priming of the face to be sealed, and, further, which can seal a face that could not be sealed by a conventional curing type-polysiloxane composition. This sealant comprises as the principal component an adhesive polyorganosiloxane which has been produced by reaction between a copolymer consisting of the triorganosiloxy units and $SiO_2$ units and containing hydroxyl groups or alkoxy groups attached to the silicon atoms, with a polydiorganosiloxane end-blocked by silanol groups. This sealant, then, shows adhesive property together with tackiness and shows a certain degree of hardness upon vaporization of the solvent contained therein. For these reasons, this sealant is sometimes employed for practical uses. However, there are problems arising from the use of the organic solvent, such as high shrinkage in the curing stage caused by volatilization of the solvent which brings about cracks accompanying the shrinkage.

Accordingly, a primary object of the present invention is to provide a sealant which can seal joint portions of buildings, constructions, etc. without priming to give an adhesion property thereto.

Another object of the invention is to provide a sealant which undergoes little shrinkage in the curing stage and substantially no cracking.

Other objects of the invention will be apparent from the following description and embodiments.

These objects are now achieved by an adhesive polyorganosiloxane composition comprising:

(A) a polydioganosiloxane being end-blocked by silanol groups and having a viscosity of 100–200,000 cSt at 25° C.;

(B) an aminoxy group-containing organosilicon compound having more than 2 organoaminoxy groups per molecule on the average;

(C) an inorganic filler; and (D) a monohydric alcohol having the formula R—OH in which R is a primary or secondary hydrocarbon group selected from the group consisting of a monovalent saturated aliphatic hydrocarbon group and an aralkyl group, and having a vapor pressure of at least 0.1 mmHg at 20° C.

The adhesive polyorganosiloxane composition of the present invention shows excellent elasticity upon curing and keeps a semi-cured condition in the internal part to show adhesive property with tackiness for a certain long period. Accordingly, the composition of the invention requires no priming of portions or faces to be sealed. Further, the composition of the invention can seal portions or faces which could not be sealed by conventional curing type-polyorganosiloxane compositions. Moreover, there can occur little shrinkage in the curing stage and no cracks are produced.

The present invention is further described by the following detailed description.

The (A) component of the composition of the invention is substantially the same as the polydiorganosiloxane having silanol groups at the terminals which is generally contained in the condensation type-polysiloxane composition that cures at room temperature. However, the (A) component belonging to the polydiorganosiloxane which is end-blocked by silanol groups ought to have a viscosity in the range of 100–200,000 cSt at 25° C. so that the (A) component shows physical properties suitable for use as a sealant of buildings, constructions, etc. A viscosity lower than 100 cSt brings about poor elasticity of the cured surface of the product, and a viscosity higher than 200,000 cSt hinders the production of a homogeneous composition and lowers the extrusion workability. The preferred range of the viscosity is 500–50,000 cSt at 25° C., from the viewpoint of balancing both properties.

Examples of the organic groups attached directly to the silicon atoms in the polydiorganosiloxane (A) component include alkyl groups such as methyl, ethyl, propyl, butyl and hexyl; alkenyl groups such as vinyl and allyl; aryl groups such as phenyl; aralkyl groups such as β-phenylethyl; and monovalent substituted hydrocarbon groups such as 3,3,3-trifluoropropyl, chloromethyl and β-cyanomethyl. Among these groups, monovalent hydrocarbon groups such as methyl, vinyl and phenyl are advantageous, from the viewpoint of easiness of the production. Particularly preferred is the methyl group. The polydiorganosiloxane (A) in which the organic group attached directly to the silicon atom is the methyl group is very advantageous because the intermediate compound employed for its production is very easily obtainable and the viscosity of the methyl group-containing polydioganosiloxane (A) is lowest in view of the polymerization degree to give a good balance between the extruding workability and the physical property. Accordingly, it is preferred that at least 85% of the organic groups of the polydioganosiloxane (A) are methyl groups. Moreover, it is most preferred that substantially all of the organic groups are methyl groups. However, if heat resistance or cold resistance is required, a part of the organic groups is preferably replaced with phenyl groups.

The (B) component of the composition of the invention, that is an aminoxy group-containing organosilicon compound, works to cause cross linking and chain prolongation of the polysiloxane through a dehydroxyamination reaction with the silanol groups present at the terminals of the (A) component, and may be either a silane derivative, or a straight, branched or cyclic siloxane derivative.

For the purpose of impacting a good reactivity to produce a sealant having high elongation, however, a combination of cyclic polysiloxanes containing two and three aminoxy groups, respectively, in the molecule is preferred. Examples of the organic groups attached to the aminoxy group include a couple of monovalent hydrocarbon groups such as methyl, ethyl, propyl, butyl and cyclohexyl, and one divalent hydrocarbon group such as butylene and pentylene. In view of the availability of the starting material, easiness of the production, the reactivity and easy volatilization of the released organohydroxylamine, however, the organic group preferably is the ethyl group.

Examples of the aminoxy group-containing organosilicon compound (B) are as follows:

Si(ONEt₂)₄, MeSi(ONEt₂)₃, PhSi(ONMe₂)₃, PhSi(ONEt₂)₃,

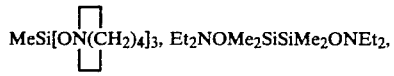

Et₂NOMe₂SiOSiMe₂ONEt₂, Et₂NOMe₂SiOPh₂SiOSiMe₂ONEt₂

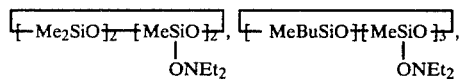

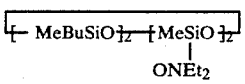

MeSi[OMe₂SiONEt₂]₃, PhSi[OMe₂SiONEt₂]₃

In the above formulae and below mentioned examples, Me, Et, Bu, Vi and Ph mean methyl, ethyl, butyl, vinyl and phenyl groups, respectively.

The aminoxy group-containing organosilicon compound (B) is introduced in the composition in the amount of 0.1-30 parts by weight, preferably 1-15 parts by weight, based on 100 parts by weight of the (A) component. If the amount of the aminoxy group-containing organosilicon compound (B) is less than 0.1 part by weight, the rate of the reaction with the polydiorganosiloxane end-blocked by silanol groups increases to reduce the working time, and if the amount of the compound (B) exceeds 30 parts by weight, the elasticity of the surface layer of the product is lowered. The (C) component, that is, an inorganic filler, is introduced into the composition to give the composition an adequate fluidity, or non-fluidity, or to give mechanical strength and hardness required to the sealant for the building and construction use, according to the purpose and working conditions of the sealing. Examples of the inorganic fillers (C) include fumed silica, precipitated silica, silica aerogel, pulverized silica, diatomaceous earth, ferric oxide, titanium oxide and calcium carbonate, preferably in the fine powder form. Particularly preferred is calcium carbonate, because the use of calcium carbonate enables production of the composition product having high elongation at the cured elastic surface layer. The inorganic filler can be employed singly or in combination.

The inorganic filler (C) is introduced into the composition in the amount of 5-300 parts by weight, preferably 30-200 parts by weight, based on 100 parts by weight of the (A) component. If the amount of the inorganic filler (C) is less than the lower limit, the cured elastic surface layer of the product cannot acquire the required physical properties, and if the amount is more than the upper limit, the workability lowers.

The composition can contain pigments such as titanium oxide, cobalt oxide, red ferric oxide, carbon black and phthalocyanine pigments in amounts generally employed for the pigments.

The (D) component is a monohydric alcohol having the formula R—OH, in which R is a primary or secondary hydrocarbon group, preferably having 4 to 7 carbon atoms, selected from the group consisting of a monovalent saturated aliphatic hydrocarbon group and an aralkyl group, and is requisite for providing the composition with high adhesive property, that is, the characteristic feature of the present invention in which the surface of the composition product is readily cured to show satisfactory elasticity, and simultaneously the internal portion is kept in a semi-cured state to show satisfactory tackiness.

The (D) component works to control the reaction between the aminoxy group-containing organosilicon compound (B) and the polydiorganosiloxane having the silanol group at the terminal (A) to maintain the reaction product in a semi-cured state with tackiness. For the formation of a elastic surface layer on the composition product, the alcohol ought to have the vapor pressure of at least 0.1 mmHg at 20° C., preferably at least 0.5 mmHg at 20° C. If the vapor pressure is lower than 0.1 mmHg, the surface layer of the composition product hardly acquires satisfactory elasticity and further the surface layer is apt to be soiled with dust and dirt due to the remaining tackiness and is apt to be constricted or broken due to variation of the width of the sealant-introduced portion. If the vapor pressure is too high, however, the alcohol likely escapes from the composition in various stages such as stages for mixing, deforming and placing the composition on the portion to be sealed, resulting in a decrease of the effect of the introduced alcohol and appearance of nonuniformity in the same effect. For this reason, the vapor pressure of the alcohol (D) preferably is not higher than 30 mmHg.

As described hereinbefore, the monohydric alcohol to be introduced as the (D) component is selected from primary and secondary alcohols. The primary and secondary alcohols are satisfactory for the control of the reaction of the aminoxy group-containing organosilicon compound (B) with the polydioganosiloxane being end-blocked by silanol groups. In contrast to the primary and secondary alcohols, however, a tertiary alcohol shows only a poor controlling effect on the above-mentioned reaction.

The alcohol (D) is introduced into the composition in the amount of 0.01-5 parts by weight, preferably 0.05-1 part by weight, based on 100 parts by weight of the (A) component. If the amount of the alcohol (D) is less than 0.01 part by weight, the satisfactory adhesive property of the characteristic feature of the invention cannot be provided because the semi-cured conditions with tackiness at a certain level cannot be produced in the composition product. If the amount exceeds 5 parts by weight, the surface layer of the composition product acquires only poor elasticity.

Examples of the monohydric alcohols, the (D) component, are as follows:

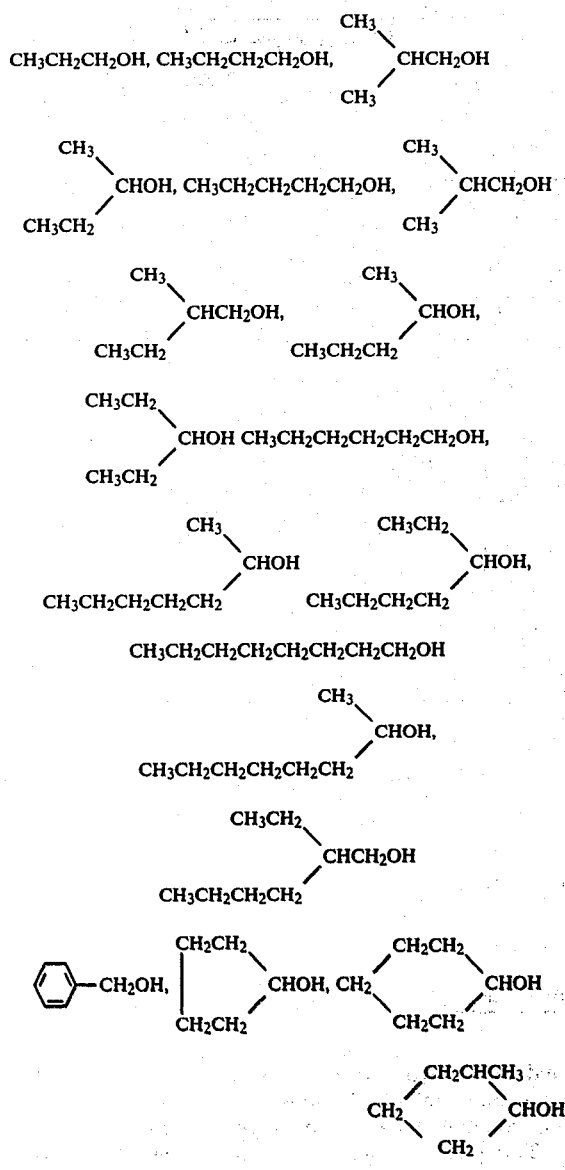

As described hereinbefore, the adhesive composition of the present invention shows excellent elasticity and adhesion to the portions, faces, joints, and the like, of the material for the use in the building, construction, and civil engineering fields, with no adverse effects such as shrinkage in the curing stage. Accordingly, the adhesive composition of the invention is of value as the sealant to be used in these fields. The advantageous features of the adhesive composition such as occurrence of stress at a low level under stretching or compressing action are further favorable to the use of the composition of the invention as the sealing material, because the low stress enables the sealant to follow easily variation of the width of the sealed portion.

The adhesive composition of the invention is generally employed for practical uses in the following manner. The (B) component, the aminoxy group-containing organosilicon, the (D) component, the monohydric alcohol, and other components are separately stored in respective vessels and are mixed altogether immediately prior to the actual use such as for sealing joint portions.

BRIEF DESCRIPTION OF DRAWINGS

FIG. 1 shows a typical test piece subjected to the tension test and

FIG. 2 shows the cross-sectional view of the test piece of FIG. 1.

FIG. 3 shows a typical test piece subjected to the fatigue test. In these Figures, the numerals except those mentioned below indicate the dimensions, in which the unit is mm.

In FIGS. 1 to 3, the following reference numerals identify the following parts:

1: test sample, 2: substrate, 3: elastic cured layer of test sample, 4: semi-cured layer with tackiness, 5: mortar, 6: soft urethane form (15ϕ).

The present invention will be further illustrated by the following examples, in which "part" is used to mean "part by weight", unless otherwise indicated.

EXAMPLE 1

A base compound was produced by mixing, in a kneader, 100 parts of polydimethylsiloxane end-blocked by silanol groups having a viscosity of 5,000 cSt at 25° C., 50 parts of heavy type calcium carbonate having a mean diameter of 1 micron and 50 parts of light type calcium carbonate having a mean diameter of 0.2 micron and having been treated with stearic acid.

100 Parts of the so produced base compound, 3.0 parts of a cross linking agent mixture consisting of 94% by weight of

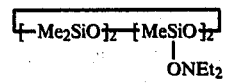

and 6% by weight of

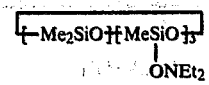

and a monohydric alcohol, as set forth below, were mixed to give test samples 10–17, in which the sample 10 employing no alcohol was tested for comparison, and the sample 17 employing tertiary alcohol as the monohydric alcohol was also tested for comparison.

Test pieces in the form illustrated in FIG. 1 were prepared, using the samples 10–17, respectively. The test pieces were then cured at room temperature for 14 days, and subsequently immersed in warm water at 50° C. for 48 hours. The test pieces were recovered from the water to subject them to the tension test. The tackiness of the test sample was evaluated by observing the sample surface upon completion of the curing at room temperature for 14 days. The cross-sectional view of the typical test sample upon the aging is given in FIG. 2.

The results are set forth in Table 1.

| Test Sample | Alcohol | Part |
|---|---|---|
| 10 | none | — |
| 11 | n-propyl alcohol | 0.25 |
| 12 | n-butyl alcohol | 0.25 |
| 13 | n-amyl alcohol | 0.25 |
| 14 | n-hexyl alcohol | 0.25 |
| 15 | n-heptyl alcohol | 0.25 |
| 16 | n-octyl alcohol | 0.25 |

-continued

| Test Sample | Alcohol | Part |
|---|---|---|
| 17 | tert-amyl alcohol | 0.25 |

TABLE 1

| Sample No. | 10 | 11 | 12 | 13 | 14 | 15 | 16 | 17 |
|---|---|---|---|---|---|---|---|---|
| Results of Tension Test | | | | | | | | |
| *Surface: Mortar* | | | | | | | | |
| Elongation at Breaking (%) | 80 | 1,350 | 1,470 | 1,480 | 1,450 | 1,090 | 1,040 | 170 |
| 50% Modulus (kgf/cm$^2$) | 0.75 | 0.26 | 0.35 | 0.35 | 0.30 | 0.26 | 0.22 | 0.67 |
| Maximum Tension Stress (kgf/cm$^2$) | 1.48 | 0.39 | 0.50 | 0.42 | 0.31 | 0.27 | 0.23 | 1.09 |
| Cohesive Failure Ratio (%) | 0 | 100 | 100 | 100 | 100 | 100 | 100 | 0 |
| *Surface: ALC* | | | | | | | | |
| Elongation at Breaking (%) | 70 | 1,220 | 1,330 | 1,390 | 1,380 | 1,170 | 1,190 | 140 |
| 50% Modulus (kgf/cm$^2$) | 0.75 | 0.28 | 0.41 | 0.44 | 0.34 | 0.32 | 0.33 | 0.70 |
| Maximum Tension Stress (kgf/cm$^2$) | 1.37 | 0.42 | 0.50 | 0.52 | 0.45 | 0.36 | 0.37 | 1.03 |
| Cohesive Failure Ratio (%) | 0 | 100 | 100 | 100 | 100 | 100 | 100 | 0 |
| *Surface: Biscuit Tile* | | | | | | | | |
| Elongation at Breaking (%) | 170 | 1,320 | 1,550 | 1,500 | 1,540 | 1,080 | 1,060 | 230 |
| 50% Modulus (kgf/cm$^2$) | 0.75 | 0.27 | 0.33 | 0.34 | 0.28 | 0.25 | 0.19 | 0.69 |
| Maximum Tension Stress (kgf/cm$^2$) | 1.85 | 0.42 | 0.40 | 0.39 | 0.39 | 0.26 | 0.20 | 1.24 |
| Cohesive Failure Ratio (%) | 0 | 100 | 100 | 100 | 100 | 100 | 100 | 0 |
| Tackiness on Sample Surface | | None | None | None | None | None | Little | None |

EXAMPLE 2

A base compound was produced by mixing, in a kneader, 100 parts of polydimethylsiloxane end-blocked by silanol groups and having a viscosity of 3,000 cSt at 25° C. and 65 parts of light type calcium carbonate having a mean diameter of 0.6 micron and having been treated with rosin.

100 Parts of the so produced base compound, 4.0 parts of a cross linking agent mixture consisting of 95% by weight of

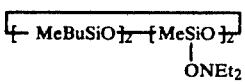

and 5% by weight of

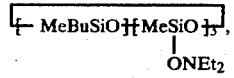

and a monohydric alcohol stated below were mixed to give test samples 20–26, in which the sample 20 employing no alcohol was tested for comparison.

Test pieces in the form illustrated in FIG. 1 were prepared, using the samples 20–26, respectively. The test pieces were then cured at room temperature for 14 days, and subsequently immersed in warm water at 50° C. for 48 hours. The test pieces were recovered from the water to subject them to the tension test. The tackiness of the test sample was evaluated by observing the sample surface upon completion of the curing at room temperature for 14 days.

The results are set forth in Table 2.

| Test Sample | Alcohol | Part |
|---|---|---|
| 20 | none | — |
| 21 | isobutyl alcohol | 0.75 |
| 22 | isoamyl alcohol | 0.75 |
| 23 | sec-butyl alcohol | 0.75 |
| 24 | sec-amyl alcohol | 0.75 |
| 25 | cyclopentyl alcohol | 0.75 |
| 26 | cyclohexyl alcohol | 0.75 |

TABLE 2

| Sample No. | 20 | 21 | 22 | 23 | 24 | 25 | 26 |
|---|---|---|---|---|---|---|---|
| Results of Tension Test | | | | | | | |

TABLE 2-continued

| Sample No. | 20 | 21 | 22 | 23 | 24 | 25 | 26 |
|---|---|---|---|---|---|---|---|
| Surface: Mortar | | | | | | | |
| Elongation at Breaking (%) | 40 | 1,410 | 1,430 | 1,340 | 1,380 | 1,350 | 1,270 |
| 50% Modulus (kgf/cm$^2$) | — | 0.32 | 0.29 | 0.41 | 0.40 | 0.44 | 0.58 |
| Maximum Tension Stress (kgf/cm$^2$) | 1.12 | 0.48 | 0.45 | 0.66 | 0.74 | 0.77 | 0.95 |
| Cohesive Failure Ratio (%) | 0 | 100 | 100 | 100 | 100 | 100 | 100 |
| Tackiness on Sample Surface | None | None | None | None | None | None | None |

EXAMPLE 3

A base compound was produced by mixing 100 parts of polydimethylsiloxane end-blocked by silanol groups having a viscosity of 10,000 cSt at 25° C., 50 parts of light type calcium carbonate having a mean diameter of 0.5 micron and 50 parts of colloidal calcium carbonate having a mean diameter of 0.05 micron and having been treated with stearic acid.

100 Parts of the so produced base compound, 2.5 parts of a cross linking agent mixture consisting of 93% by weight of

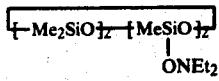

and 7% by weight of

and a monohydric alcohol stated below were mixed to give test samples 30–33, in which the sample 30 employing no alcohol was tested for comparison.

Test pieces in the form illustrated in FIG. 1 were prepared, using the samples 30–33, respectively. The test pieces were then cured at room temperature for 14 days, and subsequently immersed in warm water at 50° C. for 48 hours. The test pieces were recovered from the water to subject them to the tension test. The tackiness of the test sample was evaluated by observing the sample surface upon completion of the curing at room temperature for 14 days.

The results are set forth in Table 3.

| Test Sample | Alcohol | Part |
|---|---|---|
| 30 | none | — |
| 31 | active amyl alcohol | 0.15 |
| 32 | methylamyl alcohol | 0.15 |
| 33 | benzyl alcohol | 0.15 |

TABLE 3

| Sample No. | 30 | 31 | 32 | 33 |
|---|---|---|---|---|
| Results of Tension Test | | | | |
| Surface: Mortar | | | | |
| Elongation at Breaking (%) | 120 | 1,500 | 1,470 | 1,330 |
| 50% Modulus (kgf/cm$^2$) | 0.60 | 0.29 | 0.33 | 0.56 |
| Maximum Tension Stress (kgf/cm$^2$) | 1.34 | 0.46 | 0.51 | 0.90 |
| Cohesive Failure Ratio (%) | 0 | 100 | 100 | 100 |
| Tackiness on Sample Surface | None | None | None | None |

EXAMPLE 4

A base compound was produced by mixing 100 parts of polydimethylsiloxane end-blocked by silanol groups having a viscosity of 7,500 cSt at 25° C., 50 parts of light type calcium carbonate having a mean diameter of 0.5 micron and 50 parts of colloidal calcium carbonate having a mean diameter of 0.05 micron and having been treated with stearic acid.

100 Parts of the so produced base compound, 3.0 parts of a cross linking agent mixture consisting of 96% by weight of

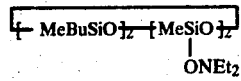

and 4% by weight of

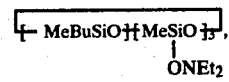

and a monohydric alcohol stated below were mixed to give test samples 41–49.

Test pieces in the form illustrated in FIG. 3 were prepared, using the samples 41–49, respectively. The test piece was then cured at room temperature for 14 days. The test piece was placed in a repeated compression and tensile tester, and subjected to variation of the joint width within ±20% for 2,000 times. The test piece was observed after completion of the test to examine conditions of the test piece, especially fatigue of respective pieces.

The results are set forth in Table 4.

| Test Sample | Alcohol | Part |
|---|---|---|
| 41 | n-butyl alcohol | 0.075 |
| 42 | " | 0.35 |
| 43 | " | 0.75 |
| 44 | 3-pentyl alcohol | 0.075 |

-continued

| Test Sample | Alcohol | Part |
|---|---|---|
| 45 | " | 0.35 |
| 46 | " | 0.75 |
| 47 | 2-ethylbutyl alcohol | 0.075 |
| 48 | " | 0.35 |
| 49 | " | 0.75 |

TABLE 4

| Test Sample No. | 41 | 42 | 43 | 44 | 45 | 46 | 47 | 48 | 49 |
|---|---|---|---|---|---|---|---|---|---|
| Conditions of Test Piece After Repeated Test | | | | | | | | | |
| No remarkable change was observed in every test | | | | | | | | | |

The embodiments of the invention in which an exclusive property or privilege is claimed are defined as follows:

1. An adhesive polyorganosiloxane composition comprising:
   (A) a polydiorganosiloxane end-blocked by silanol groups and having a viscosity of 100–200,000 cSt at 25° C.;
   (B) an aminoxy group-containing organosilicon compound having more than 2 organoaminoxy groups per molecule on the average;
   (C) an inorganic filler; and
   (D) a monohydric alcohol having the formula R—OH, in which R is a primary or secondary hydrocarbon group selected from the group consisting of a monovalent saturated aliphatic hydrocarbon group and an aralkyl group, and having a vapor pressure of at least 0.1 mmHg at 20° C.

2. An adhesive polyorganosiloxane composition as claimed in claim 1, which comprises 100 parts by weight of the polydioganosiloxane (A), 0.1–30 parts by weight of the aminoxy group-containing organosilicon compound (B), 5–300 parts by weight of the inorganic filler (C), and 0.01–5 parts by weight of the monohydric alcohol (D).

3. An adhesive polyorganosiloxane composition as claimed in claim 1, in which at least 85% of the organo groups of the polydiorganosiloxane (A) are methyl groups.

4. An adhesive polyorganosiloxane composition as claimed in claim 3, in which substantially all of the organo groups of the polydiorganosiloxane (A) are methyl groups.

5. An adhesive polyorganosiloxane composition as claimed in claim 1, in which the viscosity of the polydiorganosiloxane (A) ranges from 500 to 50,000 cSt at 25° C.

6. An adhesive polyorganosiloxane composition as claimed in claim 1, in which the organo group attached to the aminoxy group of the organoaminoxy group is ethyl.

7. An adhesive polyorganosiloxane composition as claimed in claim 2, in which the amount of the aminoxy group-containing organosilicon compound (B) is 1–15 parts by weight per 100 parts by weight of the polydiorganosiloxane (A).

8. An adhesive polyorganosiloxane composition as claimed in claim 1, in which the inorganic filler (C) is calcium carbonate.

9. An adhesive polyorganosiloxane composition as claimed in claim 2, in which the amount of the filler (C) is 30–200 parts by weight per 100 parts by weight of the polydiorganosiloxane (A).

10. An adhesive polyorganosiloxane composition as claimed in claim 1, in which the monohydric alcohol (D) is a monohydric alcohol having a vapor pressure of 0.5–30 mmHg at 20° C.

11. An adhesive polyorganosiloxane composition as claimed in claim 2, in which the amount of the monohydric alcohol (D) is 0.05–1 part by weight per 100 parts by weight of the polydiorganosiloxane (A).

12. An adhesive polyorganosiloxane composition as claimed in claim 2, in which R in the formula R—OH has four to seven carbon atoms.

* * * * *